United States Patent
Takeuchi

(10) Patent No.: US 7,009,315 B2
(45) Date of Patent: Mar. 7, 2006

(54) APPARATUS FOR CONVERTING VIBRATION ENERGY INTO ELECTRIC POWER

(75) Inventor: Kesatoshi Takeuchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/125,567

(22) Filed: Apr. 19, 2002

(65) Prior Publication Data

US 2002/0172060 A1   Nov. 21, 2002

(30) Foreign Application Priority Data

Apr. 20, 2001  (JP) ............................. 2001-123410

(51) Int. Cl.
   *H02K 33/00*  (2006.01)
(52) U.S. Cl. .................. 310/15; 310/12; 310/13; 310/14; 310/20; 310/24; 290/1 R
(58) Field of Classification Search ............... 290/1 R; 310/12–15, 23, 36, 20, 24, 156.55–156.61, 310/194, 67 R; 29/596
   See application file for complete search history.

(56) References Cited

U.S. PATENT DOCUMENTS

| | | | | |
|---|---|---|---|---|
| 5,822,167 A | * | 10/1998 | Schmitz | ...................... 361/143 |
| 5,945,749 A | * | 8/1999 | Li | ............................... 310/15 |
| 6,066,999 A | * | 5/2000 | Pischinger | ................... 335/266 |
| 6,169,343 B1 | * | 1/2001 | Rich, Sr. | ...................... 310/15 |
| 6,476,702 B1 | * | 11/2002 | Hartwig et al. | ............. 335/220 |

FOREIGN PATENT DOCUMENTS

| | | |
|---|---|---|
| EP | 0 964 502 A2 | 12/1999 |
| JP | 10-174411 | 6/1998 |

\* cited by examiner

*Primary Examiner*—Darren Schuberg
*Assistant Examiner*—Yahveh Comas
(74) *Attorney, Agent, or Firm*—Nixon Peabody LLP

(57) ABSTRACT

An apparatus for converting vibration energy into electric power is provided, in which vibration of a power source is transmitted to a power-generating coil 14, and is then transmitted to an iron core 20 via helical compression springs 26 and 28, thereby causing relative movement between the iron core 20 and the power-generating coil 14 due to inertia, resulting in a change in the magnetic field. An electromotive force is thus generated due to electromagnetic induction, thereby causing a current to flow to an electric wire material 18. Specifically, use of vibration of the power source as energy for power generation can achieve efficient use of energy. The acquisition of electric energy by the power generation may also lead to mitigation of the vibration.

8 Claims, 3 Drawing Sheets

(A)

(B)

APPARATUS FOR CONVERTING VIBRATION ENERGY INTO ELECTRIC POWER

BACKGROUND OF THE INVENTION

1. Field of the Invention

The present invention relates to an apparatus for converting vibration energy into electric power which electrically converts vibration energy produced when a power system is working.

2. Description of the Related Art

Conventionally, various kinds of energy-converting power generators have been considered.

For instance, literally, a wind power generation system is a power generation method using wind power, and windmill types such as a propeller type, a Darrieus type, and a paddle type have been devised for the purpose of efficient power generation.

Thermal power generation, atomic power generation, and the like have become the mainstream in the large-scale power generation field.

On the other hand, a solar cell which converts optical energy directly into electric power for use is used as a power source of calculators although it is small-scale.

Furthermore, electric automobiles, which carry a fuel cell which is used to drive a motor for travel, have advantages of no exhaust emission during travel unlike gasoline-powered vehicles, and of high energy efficiency. A solar-powered vehicle which combines the solar cell with the electric automobile is being developed.

A practical solar-powered vehicle is separately provided with a solar cell having a capacity of approximately 1000 W which is used to generate electric power with which an accumulator battery mounted on the vehicle is charged, and can thus travel.

Vehicles, particularly, electrically-driven carts (such as an electric wheelchair and a golf cart) which are driven by relatively low power, activate an electric motor to drive wheels for movement. It is noted that although an electric wheelchair and a golf cart are used as examples of electrically-driven carts, the present invention is not limited to low-speed vehicles and such vehicles using an electric motor are merely illustrative herein. Thus, it is assumed that an electric automobile, a solar-powered vehicle, etc., which may be alternatives to a vehicle having a reciprocal engine or a diesel engine be also in view.

Such vehicles may often suffer from vibration during movement. This vibration makes a passenger feel uncomfortable, and is presently attenuated by damping equipment such as a shock absorber and a coil spring.

SUMMARY OF THE INVENTION

However, this vibration is one kind of energy, and attenuation of this may lead to inefficient use of energy.

Use of vibration produced by activation of a power system, such as a vehicle, as energy to power the electric motor has not been established.

In view of this fact, an object of the present invention is to provide an apparatus for converting vibration energy into electric power which uses vibration produced by activation of a power system as vibration energy to generate electric power, thereby making efficient use of energy compatible with attenuation of the vibration.

The present invention provides an apparatus for converting vibration energy into electric power which electrically converts vibration energy produced when a power system is working. The apparatus comprises: at least one bar magnet unit to which the vibration produced when the power system is working is transmitted; a coil unit helically wound around the magnet unit; a damping unit positioned between the magnet unit and the coil unit for holding the magnet unit at the helically neutral position of the coil unit during non-vibration and for attenuating the transmission of vibration to the coil unit during vibration; and an electrical wire unit for picking up a current flowing to the winding of the coil unit by a change in the magnetic field generated when the vibration produced in the power system causes the magnet unit to move reciprocately along the helical axis of the coil unit.

According to the present invention, when a power system is not working, no relative movement occurs between the coil unit and the magnet unit, and the magnetic field is not changed, thereby causing no current to flow to the winding of the electric wire unit. Once the power system is activated, vibration produced by the power system causes the coil unit and the magnet unit to relatively move. This is because there is a delay with respect to the vibration due to force of inertia since the magnet unit is held with respect to the coil unit by the damping unit.

The relative movement between the coil unit and the magnet unit yields a change in the magnetic field, thereby causing a current to flow to the winding of the electric wire unit due to electromagnetic induction. The flow of current allows another electric part to be actuated.

Another feature is that the damping unit holds the magnet unit with respect to the coil unit according to the principle of a spring-mass system. This can provide effective power generation capabilities with respect to vibration.

Another feature is that the magnet units cross into a cruciform, with one crossing portion having a through-hole formed therein, and the other crossing portion being inserted through the through-hole. This can increase the orientation of vibration which contributes to electric power generation.

DESCRIPTION OF THE PREFERRED EMBODIMENTS (First Embodiment)

Figure 1:
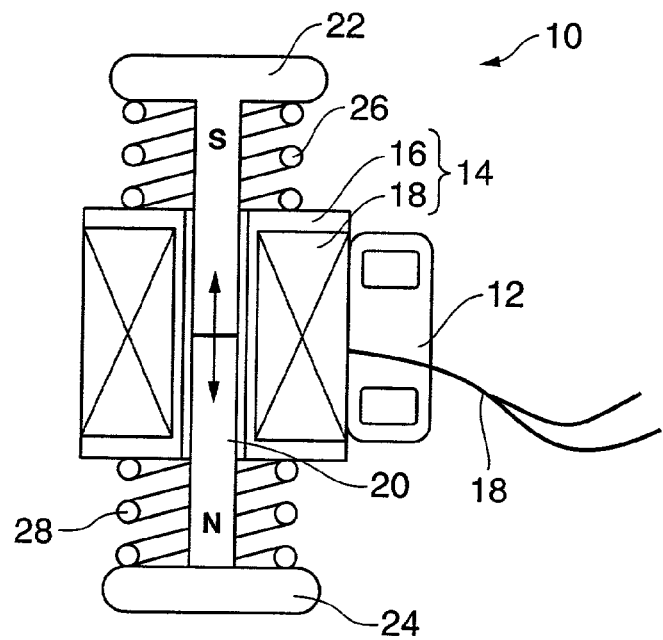
FIG. 1 is a schematic view of an electric power converting apparatus according to a first embodiment of the present invention.

FIG. 1 illustrates an electric power converting apparatus 10 according to a first embodiment of the present invention.

The electric power converting apparatus 10 is fixed to a base (support) (not shown) via an attachment 12.

A power-generating coil 14 is attached to the attachment 12. The power-generating coil 14 is formed of a cylindrical iron core 16 and an electric wire material 18, such that the electric wire material 18 is helically wound on the outer periphery of the iron core 16. The electric wire material 18 is wound in the same direction with respect to the iron core 16.

A cylindrical bar magnet 20 is inserted in the inner periphery of the iron core 16 via a bearing (not shown) for reducing the coefficient of friction. The magnet 20 is capable of axially sliding with respect to the iron core 16 with the coefficient of friction being substantially zero.

The magnet 20 is a permanent magnet having the north pole at one end and the south pole at the other end. If there is no change in a relative position relationship with respect to the power-generating coil 14, no phenomenon occurs in the magnetic field; however, as the magnet 20 axially moves, the magnetic field varies, and the variation of magnetic field produces an electromotive force due to so-called electromagnetic induction, thereby causing a current to flow to the electric wire material 18. A terminal (not shown) of the electric wire material 18 may be used for supply power to a driving source of a DC motor or a stepping motor, or to a control system for controlling these components, and may be connected to a charging system of an electric power source.

(Power Generation Effect)

The magnet 20 is provided with dish-like flanges 22 and 24 at both ends. A helical compression spring 26 is formed between the upper flange 22 in FIG. 1 and the upper end surface of the power-generating coil 14. Since the power-generating coil 14 is fixed by the attachment 12, the helical compression spring 26 urges the flange 22 to lift up in FIG. 1.

On the other hand, a helical compression spring 28 is formed between the lower flange 24 in FIG. 1 and the lower end surface of the power-generating coil 14. Since the power-generating coil 14 is fixed by the attachment 12, the helical compression spring 28 urges the flange 24 to push down in FIG. 1.

The pair of helical compression springs 26 and 28 has substantially the same urging force, so that the center of the magnet 20 in its longitudinal direction is neutrally held at the center position of the power-generating coil 14 in its axial direction. Strictly speaking, the urging forces of the helical compression springs 26 and 28 are determined in consideration of the weight (mass) of the magnet 20.

The base to which the attachment 12 is fixed is a member constituting a power system (not shown). When the power system starts operating, vibration is transmitted to the power-generating coil 14 via the attachment 12.

Then, since the magnet 20 is held between the pair of helical compression springs 26 and 28, relative movement occurs between the magnet 20 and the power-generating coil 14 according to the law of inertia. This relative movement is equivalent to the power generation effect, thereby causing a current to flow to the electric wire material 18, and both ends of the electric wire material 18 are connected to another driving system (for example, an electric motor or the like) to drive the electric motor.

The effect in the first embodiment is now described.

When the power system is not working, no vibration is transmitted to the power-generating coil 14 via the attachment 12, and there is no change in the relative position between the power-generating coil 14 and the magnet 20. This causes no change in the magnetic field, thereby causing no current to flow to the electric wire material 18.

When the power system starts operating, vibration is produced at the power system. This vibration is transmitted to the power-generating coil 14 via the attachment 12. If vibration of the power system is unevenly produced, for example, if the amplitude of vibration is large according to a periodic operation of an actuator, a buffer, or the like, may be provided for a vibration transmission system to mitigate the amplitude with preparation of some loss.

When vibration is transmitted to the power-generating coil 14, the vibration is then transmitted to the magnet 20 via the pair of helical compression springs 26 and 28. This causes relative movement between the magnet 20 and the power-generating coil 14 according to the law of inertia. In the relative movement, the magnet 20 is caused to slide with respect to the inner periphery of the iron core 16, but it smoothly slides because the bearings or the like are used to make the coefficient of friction substantially zero.

The relative movement between the power-generating coil 14 and the magnet 20 yields a change in the magnetic field. The change in the magnetic field would generate an electromotive force due to electromagnetic induction, thereby causing a current to flow to the electric wire material 18.

By connecting the electric wire material 18 to, for example, an electric motor, the current can activate the electric motor.

Figure 2:
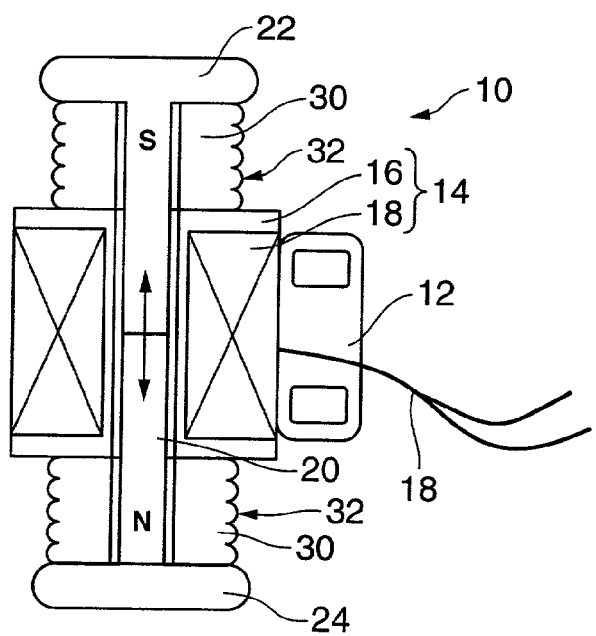
FIG. 2 is a schematic view of an electric power converting apparatus according to a modification of the first embodiment.

Although the pair of helical compression springs 26 and 28 is used as damping units for holding the magnet 20 with respect to the power-generating coil 14 in the first embodiment, casings 32 filled with a shock absorbing member 30 made of resin foam or the like, as shown in FIG. 2, may be provided between the flanges 22 and 24, and the upper end surface and the lower end surface of the power-generating coil 14.

Figure 3:
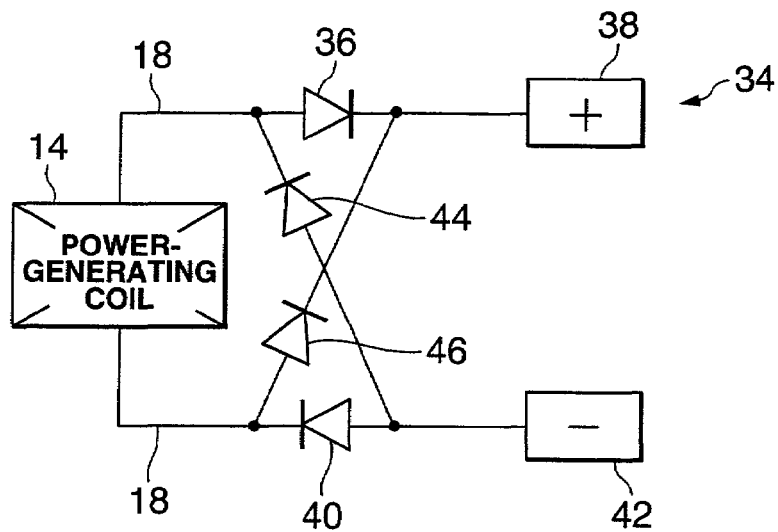
FIG. 3 is a circuit diagram of a rectifying circuit.

The electric energy generated by the vibration is an alternate current, and may be converted into a direct current. FIG. 3 illustrates a rectifying circuit 34 for rectifying the electric power generated by the vibration.

The anode side of a first diode 36 is connected to one end of the electric wire material 18 which is wound around the power-generating coil 14. The cathode side of the first diode 36 is connected to one electrode 38. The cathode side of a second diode 40 is connected to the other end of the electric wire material 18. The anode side of the second diode 40 is connected to the other electrode 42.

The cathode side of a third diode 44 is connected between the power-generating coil 14 and the first diode 36. The anode side of the third diode 44 is connected between the second diode 40 and the electrode 42.

The anode side of a fourth diode 46 is connected between the power-generating coil 14 and the second diode 40. The cathode side of the fourth diode 46 is connected between the first diode 36 and the electrode 38.

This allows a direct current which has been rectified to flow between the pair of electrodes 38 and 42 (the electrode 38 is positive while the electrode 42 is negative).

The current which has been rectified in this way can be used as power supply for a driving source of a DC motor or a stepping motor, or for a control system for controlling these components. A charging system as an electric power source may be fed back. An electrolytic capacitor may be provided between the pair of electrodes 38 and 42.

As described above, in the first embodiment, vibration of a power source is transmitted to the power-generating coil 14, and is then transmitted to the iron core 20 via the helical compression springs 26 and 28, thereby causing relative movement between the iron core 20 and the power-generating coil 14 due to inertia, resulting in a change in the magnetic field. An electromotive force is thus generated due to electromagnetic induction, thereby causing a current to flow to the electric wire material 18. Specifically, use of vibration of the power source as energy for power generation can achieve efficient use of energy. The acquisition of electric energy by the power generation may also lead to mitigation of the vibration.

(Second Embodiment)

Figure 4:
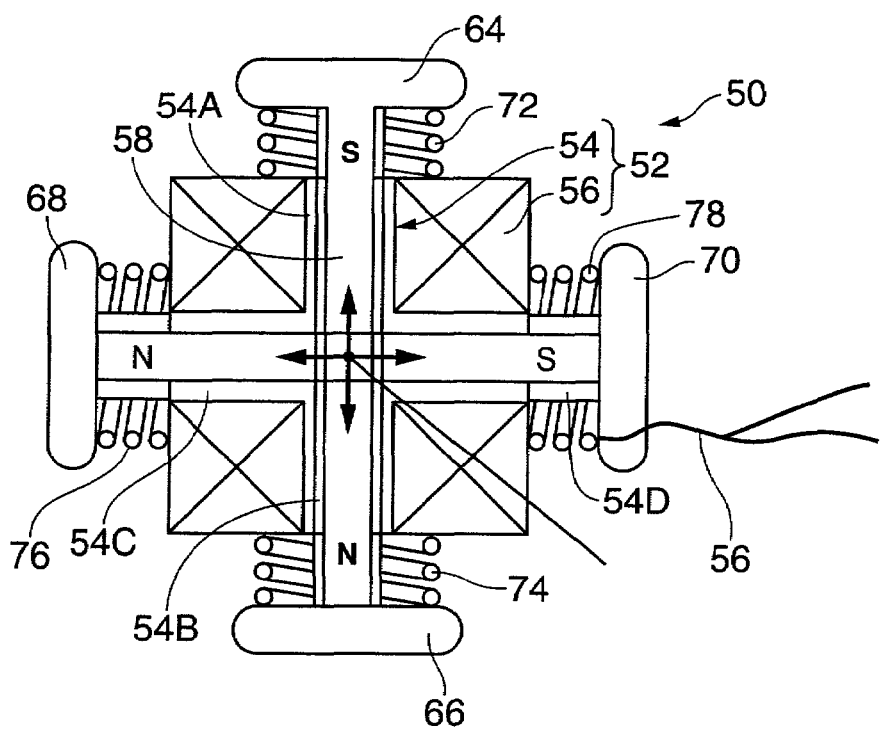
FIG. 4 is a schematic view of an electric power converting apparatus according to a second embodiment of the present invention.

A second embodiment of the present invention is now described. FIG. 4 illustrates an electric power converting apparatus 50 according to the second embodiment. The electric power converting apparatus 50 is fixed to a base (support) via an attachment (both are not shown).

A power-generating coil 52 is attached to the attachment. The power-generating coil 52 is formed of a cross-shaped cylindrical iron core 54 and an electric wire material 56.

The iron core 54 is configured by connecting one end of each of four pipes 54A, 54B, 54C, and 54D at one point, with their passageways communicating with each other. Thus, the passageway at the junction is formed into a cross.

An electric wire material 56 is helically wound on the outer periphery of each of the pipes 54A, 54B, 54C, and 54D of the iron core 54. The electric wire material 56 may be separately provided for each of the pipes 54A, 54B, 54C, and 54D, or a continuous single electric wire material 56 may be uniformly wound at the same winding.

A bearing (not shown) is provided on the inner periphery of each of the pipes 54A, 54B, 54C, and 54D constituting the iron core 54 in order to reduce the coefficient of friction.

A first cylindrical bar magnet 58 is inserted via the bearings in the pipes 54A and 54B, out of the four pipes 54A, 54B, 54C, and 54D constituting the iron core 54, which are serially and continuously coupled in the vertical direction in FIG. 4. The first magnet 58 is capable of axially (vertically in FIG. 4) sliding with respect to the pipes 54A and 54B with the coefficient of friction being substantially zero.

Figure 5:
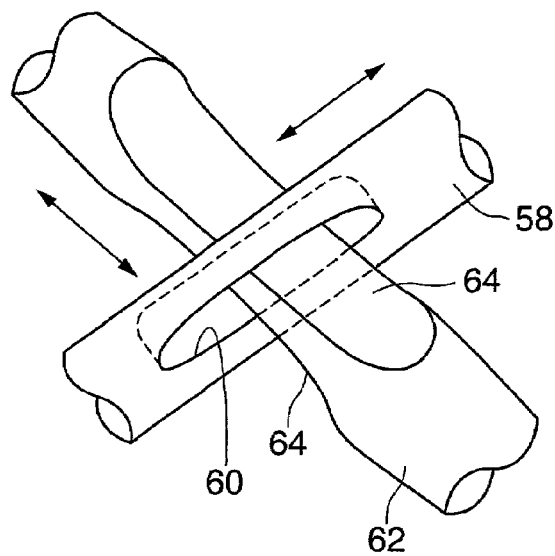
FIG. 5 is a perspective view showing the state where a pair of magnets are coupled according to the second embodiment.

As shown in FIG. 5, an elongate hole 60 is formed in the center portion of the first magnet 58 in its axial direction. The elongate hole 60 is positioned at the junction of the four pipes 54A, 54B, 54C, and 54D.

A second cylindrical bar magnet 62 is inserted via the bearings in the pipes 54C and 54D, out of the four pipes 54A, 54B, 54C, and 54D constituting the iron core 54, which are serially and continuously coupled in the horizontal direction in FIG. 4. The second magnet 62 is capable of axially (horizontally in FIG. 4) sliding with respect to the pipes 54C and 54D with the coefficient of friction being substantially zero.

A cutout portion 64 is formed in the center portion of the second magnet 62 in its axial direction so as to axially extend from a pair of parallel tangents. The cutout portion 64 is inserted through the elongate hole 60, thereby preventing interference with the first magnet 58.

This enables the first magnet 58 to slide vertically in FIG. 4, and enables the second magnet 62 to slide horizontally in FIG. 4. The movements of both magnets can be independent without mutual interference of the movements.

The first magnet 58 and the second magnet 62 are permanent magnets each having the north pole at one end and the south pole at the other end. If there is no change in a relative position relationship with respect to the power-generating coil 52, no phenomenon occurs in the magnetic field; however, as the magnets axially move, the magnetic fields vary, and the variation of magnetic fields produces an electromotive force due to so-called electromagnetic induction, thereby causing a current to flow to the electric wire material 56 (power generation effect).

The first magnet 58 and the second magnet 62 are provided with dish-like flanges 64 and 66, and 68 and 70 at both ends, respectively.

A helical compression spring 72 is formed between the upper flange 64 in FIG. 4 and the upper end surface of the power-generating coil 52. Since the power-generating coil 52 is fixed by the attachment, the helical compression spring 72 urges the flange 64 to lift up in FIG. 4.

On the other hand, a helical compression spring 74 is formed between the lower flange 66 in FIG. 4 and the lower end surface of the power-generating coil 52. Since the power-generating coil 52 is fixed by the attachment, the helical compression spring 74 urges the flange 66 to push down in FIG. 4.

A helical compression spring 76 is further formed between the left flange 68 in FIG. 4 and the left end surface of the power-generating coil 52. Since the power-generating coil 52 is fixed by the attachment, the helical compression spring 76 urges the flange 68 to push to the left in FIG. 4.

A helical compression spring 78 is further formed between the right flange 70 in FIG. 4 and the right end surface of the power-generating coil 52. Since the power-generating coil 52 is fixed by the attachment, the helical compression spring 78 urges the flange 70 to push to the right in FIG. 4.

The two pairs of helical compression springs 72 and 74, and 76 and 78, which face each other in a straight fashion, have substantially the same urging force, so that the centers of the first magnet 58 and the second magnet 62 in their respective longitudinal directions are neutrally held at the center positions of the power-generating coil 52 in its axial directions. Strictly speaking, the urging forces of the pair of helical compression springs 72 and 74 in the vertical position relationship in FIG. 4 are determined in consideration of the weight (mass) of the first magnet 58.

The base to which the attachment is fixed is a member constituting a power system (not shown). When the power system starts operating, vibration is transmitted to the power-generating coil 52 via the attachment.

Then, since the first magnet 58 and the second magnet 62 are held by the two pairs of helical compression springs 72 and 74, and 76 and 78, relative movement occurs between them and the power-generating coil 52 according to the law of inertia. This relative movement is equivalent to the power generation effect, thereby causing a current to flow to the electric wire material 56, and both ends of the electric wire material 56 are connected to another driving system (for example, an electric motor or the like) to drive the electric motor.

The effect in the second embodiment is now described. When the power system is not working, no vibration is transmitted to the power-generating coil 52 via the attachment, and there is no change in the relative position between the power-generating coil 52, and the first magnet 58 and second magnet 62. This causes no change in the magnetic field, thereby causing no current to flow to the electric wire material 56.

When the power system starts operating, vibration is produced at the power system. This vibration is transmitted to the power-generating coil 52 via the attachment. If vibration of the power system is unevenly produced, for example, if the amplitude of vibration is large according to a periodic operation of an actuator, a buffer, or the like, may be provided for a vibration transmission system to mitigate the amplitude with preparation of some loss.

When vibration is transmitted to the power-generating coil 52, the vibration is then transmitted to the first magnet 58 and the second magnet 62 via the two pairs of helical compression springs 72 and 74, and 76 and 78. This causes relative movement between the first magnet 58 and the second magnet 62, and the power-generating coil 52 according to the law of inertia. In the relative movement, the magnets are caused to slide with respect to the inner periphery of the iron core 54, but they smoothly slide because the bearings or the like are used to make the coefficient of friction substantially zero. Both magnets can slide independently using the through-hole 60 and the cutout portion 64 without mutual interference.

The relative movement between the power-generating coil 52, and the first magnet 58 or the second magnet 62 yields a change in the magnetic field. The change in the magnetic field would generate an electromotive force due to electromagnetic induction, thereby causing a current to flow to the electric wire material 56. By connecting the electric wire material 56 to, for example, an electric motor, the current can activate the electric motor.

According to the second embodiment, two-way vibration rather than one-way vibration can be used to generate electric power, thereby increasing the power generation efficiency.

Although one-dimensional vibration (one-direction) is used in the first embodiment, and two-dimensional vibration (two-direction) is used in the second embodiment, three-dimensional vibration (three-direction) may also be used. For instance, a power source which may vibrate back and forth, vertically, and horizontally during travel, like vehicle travel, preferably uses three-dimensional vibration. In this case, the electric power generating apparatus 10 (first embodiment) which vibrates in one direction may be combined with the electric power generating apparatus 50 (second embodiment) which vibrates in two directions.

In the second embodiment, two pairs of helical compression springs 72 and 74, and 76 and 78 are used as damping units for holding the first magnet 58 and the second magnet 62 with respect to the power-generating coil 52; however, as in the first embodiment, casings filled with a shock absorbing member made of resin foam or the like may be provided between the flanges 64, 66, 68, and 70, and the upper end surface, lower end surface, left end surface, and right end surface of the power-generating coil 52 (see FIG. 2).

The aforementioned rectifying circuit (see FIG. 3) may also be implemented in the second embodiment.

Figure 6:
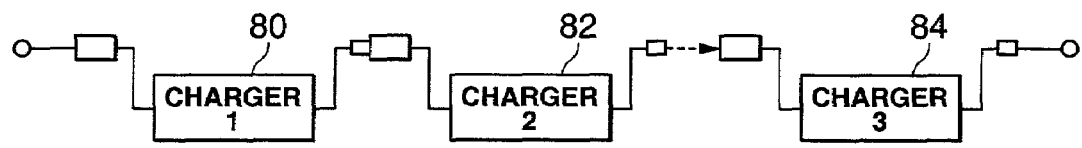
FIG. 6 is a block diagram of the connection to charge the electric power generated according to the first embodiment or the second embodiment, in which (A) shows a series connection and (B) shows a parallel connection.
Figure 6:
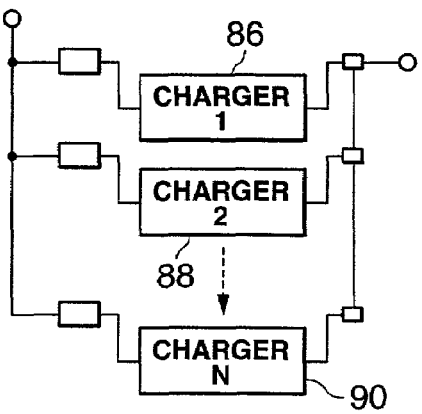

Although the electric power generated is used in real time as a driving force of an electric motor and the like in the first embodiment and the second embodiment, it may be charged by chargers 80, 82, 84, . . . which are connected in series, as shown in FIG. 6(A). It may also be charged by chargers 86, 88, 90, . . . which are connected in parallel, as shown in FIG. 6(B).

In the first and second embodiments, relative movement between a magnet and a power-generating coil according to the law of inertia causes a change in the magnetic field, thereby producing an electromotive force due to electromagnetic induction; however, a piezoelectric device may be added or alternative thereto for applying a shock during the relative movement between the magnet and the power-generating coil to generate an electromotive force due to the shock.

As described above, according to the present invention, vibration produced by activation of a power system is used as vibration energy to generate electric power, thereby, advantageously, making efficient use of energy compatible with attenuation of the vibration.

What is claimed is:

1. An apparatus for converting vibration energy into electric power which electrically converts vibration energy produced when a power system is working, comprising;
    at least two bar magnet units to which the vibration produced when the power system is working is transmitted, each magnetic unit terminating in a flange at its axial end;
    a coil unit helically wound around each magnet unit;
    a damping unit including a spring positioned between the flange of each magnet unit and the coil unit for holding the magnet unit at the helically neutral position of the coil unit in its axial direction during non-vibration and for attenuating the transmission of vibration to the coil unit during vibration, said spring of said damping unit applying an axial damping force against said coil unit and said flange of the bar magnet unit; and
    an electrical wire unit for picking up a current flowing to the winding of the coil unit by a change in the magnetic field generated when the vibration produced in the power system causes each magnet unit to move reciprocally along the helical axis of the coil unit,
    wherein the magnet units cross into a cruciform, with one crossing portion having a through-hole formed therein, and the other crossing portion being inserted through the through-hole.

2. An apparatus according to claim 1, wherein the damping unit holds the magnet unit with respect to the coil unit according to the principle of a spring-mass system.

3. An apparatus for converting vibration energy into electric power, comprising:
    at least two elongated magnet units arranged transversely to one another and terminating in first and second flanges at their axial ends and which vibrate due to vibration transmitted from a power source;
    damping units for damping the vibration of said magnet units, each damping unit including first and second springs captured between said first and second flanges of each magnet unit, respectively, and a coil unit, said springs holding the magnet unit at a helically neutral position in said coil unit in the magnet unit's axial direction during non-vibration and for attenuating the transmission of the vibration energy from the power source to the coil unit during vibration, said springs of each damping unit positioned between a magnet unit and the coil unit to apply an axial damping force against said coil unit and an axial end of the magnet unit; and
    means for generating electric power by a change in the magnetic field caused by the vibration of the magnet unit.

4. An apparatus for converting vibration energy into electric power which electrically converts vibration energy produced when a power system is working, comprising:
    a pair of elongated magnet units having opposed ends that terminate in flanges, said magnet units receiving vibration energy from the power system when the power system is working;
    a coil unit helically wound around each magnet unit;
    a damping unit including a spring captured between each flange of the magnet units and the coil unit, the damping unit holding the magnet unit at a helically neutral position of the coil unit in its axial direction during non-vibration and for attenuating the transmission of the vibration energy from the power source to the coil unit during vibration, said spring of the damping unit applying an axial damping force against said coil unit and said flange of the bar magnet unit; and an electrical wire unit for receiving a current flowing to the winding of the coil unit produced by a change in the magnetic field generated when the vibration produced in the power system causes the at least one magnet unit to move reciprocally along the helical axis of the coil unit, wherein said magnet units cross into a cruciform.

5. An apparatus for converting vibration energy into electric power which electrically converts vibration energy produced when a power system is working, comprising:

at least one bar magnet unit to which the vibration produced when the power system is working is transmitted, the at least one bar magnet unit crossing into a cruciform, with one crossing portion having a through-hole formed therein, and the other crossing portion being inserted through the through-hole;

a coil unit helically wound around the magnet unit;

a damping unit positioned between the magnet unit and the coil unit for holding the magnet unit at the helically neutral position of the coil unit in its axial direction during non-vibration and for attenuating the transmission of vibration to the coil unit during vibration; and an electrical wire unit for picking up a current flowing to the winding of the coil unit by a change in the magnetic field generated when the vibration produced in the power system causes the magnet unit to move reciprocally along the helical axis of the coil unit.

6. The apparatus according to claim 5, wherein the center of the bar magnet unit becomes to middle of the coil unit, and depending on the weight of the magnet, the spring power of the damping unit is set.

7. An apparatus for converting vibration energy into electric power which electrically converts vibration energy produced when a power system is working, comprising:

at least two bar magnet units to which the vibration produced when the power system is working is transmitted, said bar magnet units being arranged transversely to one another, and having a central portion having a substantially uniform cross-sectional area throughout its length;

coil units helically wound around the magnet units;

a damping unit positioned between each magnet unit and its coil unit for holding each magnet unit at a helically neutral position of its coil unit during non-vibration and for attenuating the transmission of vibration to the coil unit during vibration, an electrical wire unit for picking up a current flowing to the winding of each coil unit by a change in the magnetic field generated when the vibration produced in the power system causes each magnet unit to move reciprocally along the helical axis of its coil unit, wherein opposing ends of each bar magnet unit extend beyond adjacent opposing ends of its coil unit, and each damping unit is captured between one bar magnet unit and the coil unit.

8. An apparatus for converting vibration energy into electric power which electrically converts vibration energy produced when a power system is working, comprising:

at least two permanent bar magnets to which the vibration produced when the power system is working is transmitted, the two bar magnets arranged transversely with respect to one another;

a coil unit helically wound around each bar magnet;

a damping unit positioned between each bar magnet and its surrounding coil unit for holding the magnet unit at a helically neutral position of its surrounding coil unit in its axial direction during non-vibration and for attenuating the transmission of vibration to the coil units during vibration; and an electrical wire unit for picking up a current flowing to the winding of each coil unit by a change in the magnetic field generated when the vibration produced in the power system causes the magnet units to move reciprocally along the helical axis of its surrounding coil unit.

* * * * *